(12) United States Patent
Lin

(10) Patent No.: US 8,164,303 B2
(45) Date of Patent: Apr. 24, 2012

(54) CHARGING SOCKET

(75) Inventor: Chu-Keng Lin, Taipei Hsien (TW)

(73) Assignee: Cheng Uei Precision Industry Co., Ltd., Taipei Hsien (TW)

(*) Notice: Subject to any disclaimer, the term of this patent is extended or adjusted under 35 U.S.C. 154(b) by 376 days.

(21) Appl. No.: 12/626,836

(22) Filed: Nov. 27, 2009

(65) Prior Publication Data
US 2011/0127948 A1 Jun. 2, 2011

(51) Int. Cl.
*H02J 7/00* (2006.01)
*H02J 7/02* (2006.01)

(52) U.S. Cl. ........ 320/114; 320/107; 320/110; 320/111; 320/112; 320/113; 320/115

(58) Field of Classification Search .................. 320/110, 320/111, 112, 113, 114, 115; D13/107
See application file for complete search history.

(56) References Cited

U.S. PATENT DOCUMENTS 8,099,138 B2 * 1/2012 Piekarz ...................... 455/569.2
2008/0185992 A1 * 8/2008 Hoffman et al. .............. 320/110
* cited by examiner

*Primary Examiner* — Edward Tso
*Assistant Examiner* — Ahmed Omar
(74) *Attorney, Agent, or Firm* — WPAT, P.C.; Anthony King

(57) ABSTRACT

A charging socket has a base and a holding body covering the base. The holding body has an opening receiving recess, and a first holding plate. A gear element has a ring-like body mounted in the base. The ring-like body has gear teeth at an outer periphery thereof, and a connecting portion connected with the base by a connecting spring for forcing the ring-like body to rotate. A swingable arm pivoted to the base has a ratchet tooth engaged with the gear teeth for stopping the ring-like body from being pulled by the connecting spring to rotate. A movable element has a basic plate slidably received in the receiving recess, and a second holding plate. A side of the basic plate is connected with a rack parallel to a sliding direction of the movable element and is lower than a bottom of the basic plate, engaging with the gear teeth.

10 Claims, 6 Drawing Sheets

CHARGING SOCKET

BACKGROUND OF THE INVENTION

1. Field of the Invention

The present invention relates to a charging socket, and more particularly to a charging socket holding an electronic product for charging at the vehicle.

2. The Related Art

Nowadays, a variety of electronic products are broadly used, such as mobile phones, MP3, MP4, and the like. The electronic products require to be charged with electric power after being used for a period of time. But, when people travel by a car or a plane, it is inconvenient to charge the electronic products in hand. Therefore, a charger, which is capable of connecting with the car or the plane for charging the electric power to the electronic product, appears. Generally, in the process of charging, it is necessary to provide a charging socket for holding the electronic product, for preventing the electronic product from falling off the charger so as to affect normal charge, on account of unexpected shake in travel. However, the conventional charging socket are designed and manufactured according to the dimension of the electronic product. That's to say, one kind of the charging socket only can be used to hold the corresponding type of the electronic products, which limits the application range of the charging socket, and causes great inconvenience to the users.

SUMMARY OF THE INVENTION

Accordingly, an object of the present invention is to provide a charging socket for holding an electronic device. The charging socket has a housing having a base and a holding body covering the base. The holding body has an open receiving recess, and a first holding plate extended upwards from a wall of the receiving recess opposite to an opening of the receiving recess. A gear element has a ring-like body mounted in the base. The ring-like body has a plurality of gear teeth at an outer periphery thereof, and a connecting portion connected with the base by a connecting spring for forcing the ring-like body to rotate. A swingable arm pivoted to the base has a ratchet tooth at a free end thereof engaged with the gear teeth for stopping the ring-like body from being pulled by the connecting spring to rotate. A movable element has a basic plate slidably received in the receiving recess, and a second holding plate extending upwards from an end of the basic plate away from the first holding plate, facing and spaced from the first holding plate for holding the electronic device. A side of the basic plate is connected with a rack which extends along a sliding direction of the movable element and is lower than a bottom of the basic plate, for engaging with the gear teeth of the gear element. The ratchet tooth of the swingable arm is swung to disengage with the gear teeth, and the gear element is pulled by the connecting spring to rotate. The second holding plate is urged to move away from the first holding plate because the engagement between the rack and the gear teeth. When the second holding plate is pushed to approach the first holding plate, the gear element is brought by the rack to rotate. The ratchet tooth slides along the gear teeth and stops the gear element from being pulled by the connecting spring to rotate reversely.

As described above, the charging socket is provided with the movable element which is capable of being moved respect to the housing by the gear element and the swingable arm. Accordingly, the dimension between the first and second holding plates can be adjusted according to the outline dimension of different types of the electronic devices, thereby holding the electronic devices firmly, which spreads the application range of the charging socket. Meanwhile, the charging socket is convenient for user to repeat use and improves the holding performance.

BRIEF DESCRIPTION OF THE DRAWINGS

The present invention will be apparent to those skilled in the art by reading the following description of a thereof, with reference to the attached drawings, in which.

DETAILED DESCRIPTION OF THE EMBODIMENT

Figure 1:
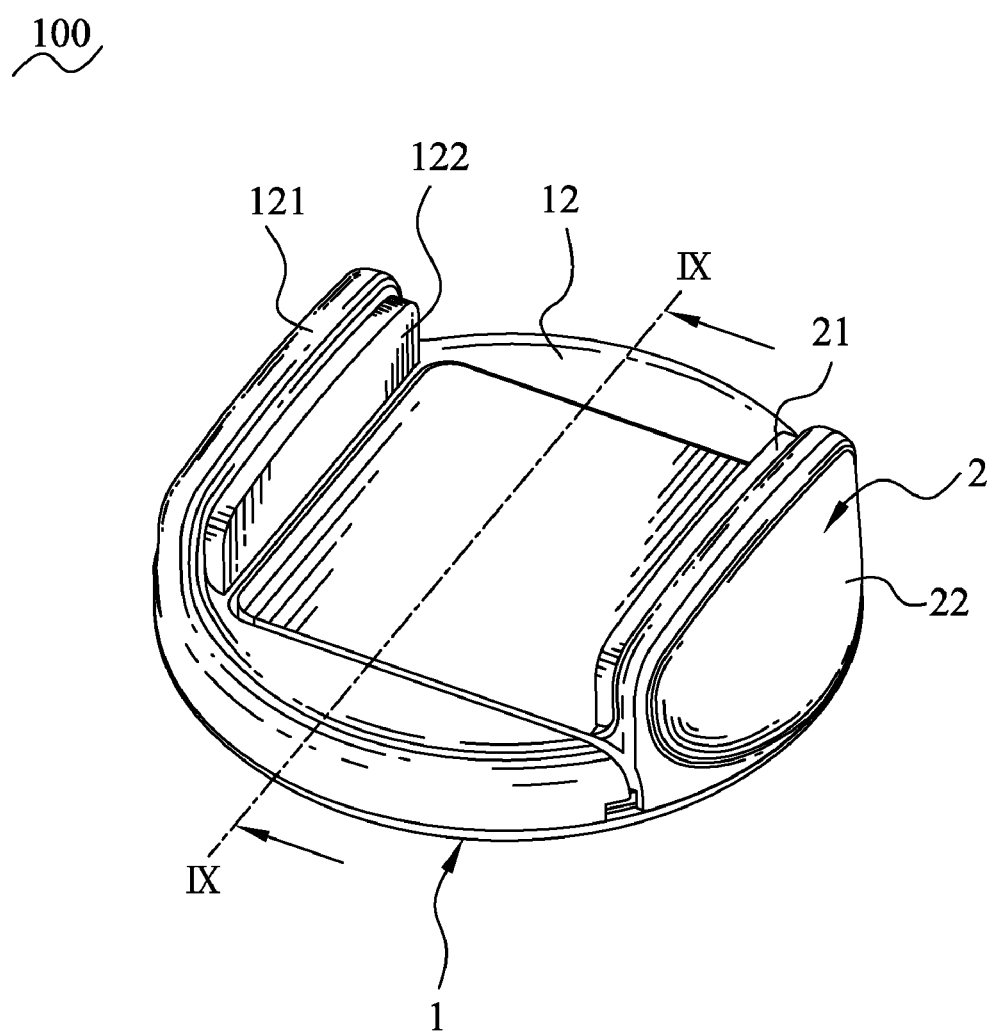
FIG. 1 is an assembled, perspective view of a charging socket of an embodiment in according to the present invention.
Figure 2:
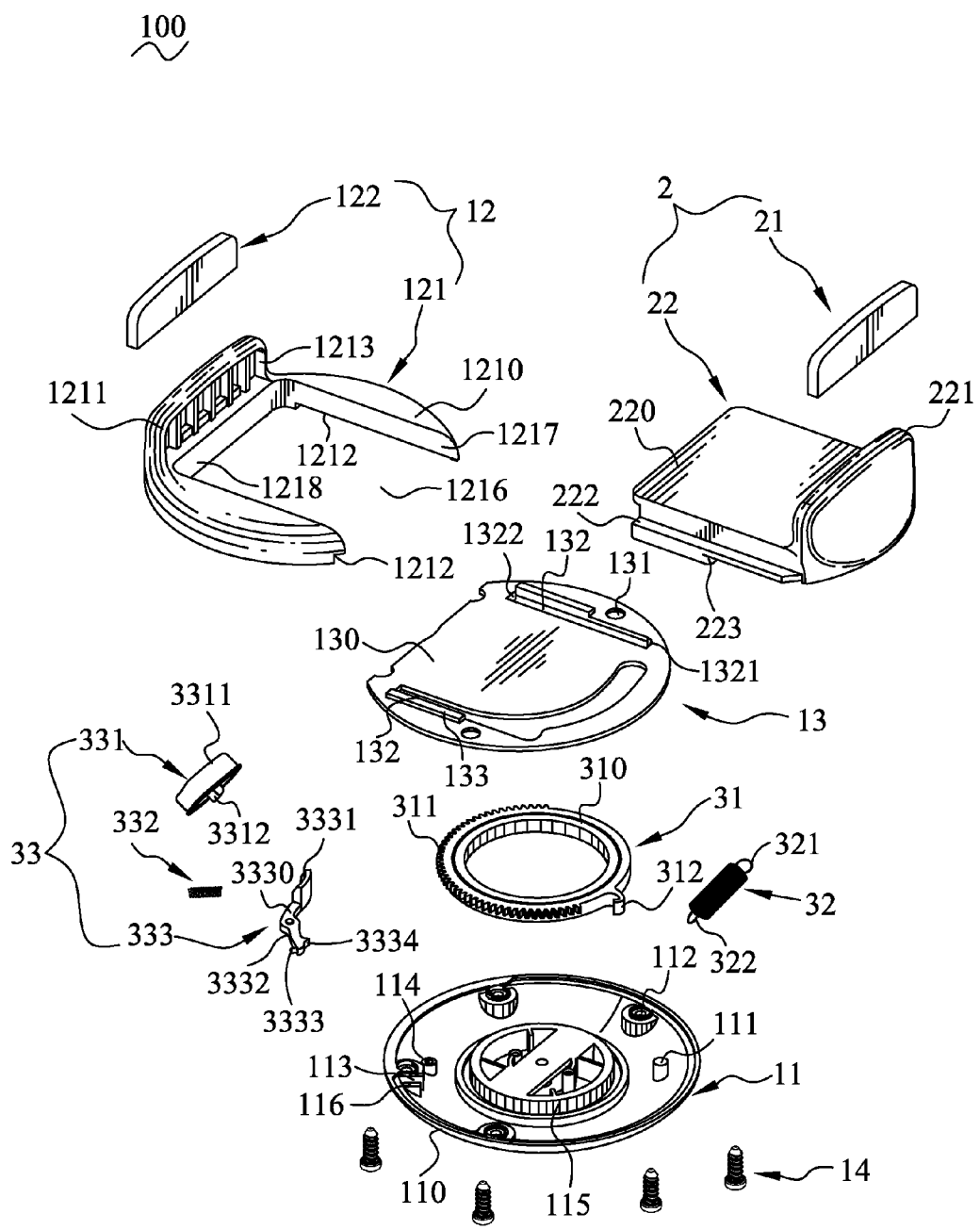
FIG. 2 is an exploded, perspective view of the charging socket shown in FIG. 1.

Referring to FIG. 1 and FIG. 2, a charging socket 100 in accordance with the present invention includes a housing 1, a movable element 2 slidably mounted to the housing 1, and a positioning component. The housing 1 has a base 11, a holding element 12 mounted above the base 11, and a gasket 13 disposed between the base 11 and the holding element 12.

Please refer to FIG. 2, the base 11 has a circular tray 110, a cylindrical shaft 115 protruded upwards from a center of the tray 110. The tray 110 has a positioning column 111 extending upwards and downwards and a pivot hole 114, which are arranged substantially symmetrically about the shaft 115. Two blocking pieces 116 are protruded upwards from the tray 110 side by side, and adjacent to the pivot hole 114. The blocking pieces 116 extend toward the shaft 115 and are spaced away from each other to form a fixing groove 113. A plurality of thread holes 112 is formed on and passes through the tray 110.

Figure 3:
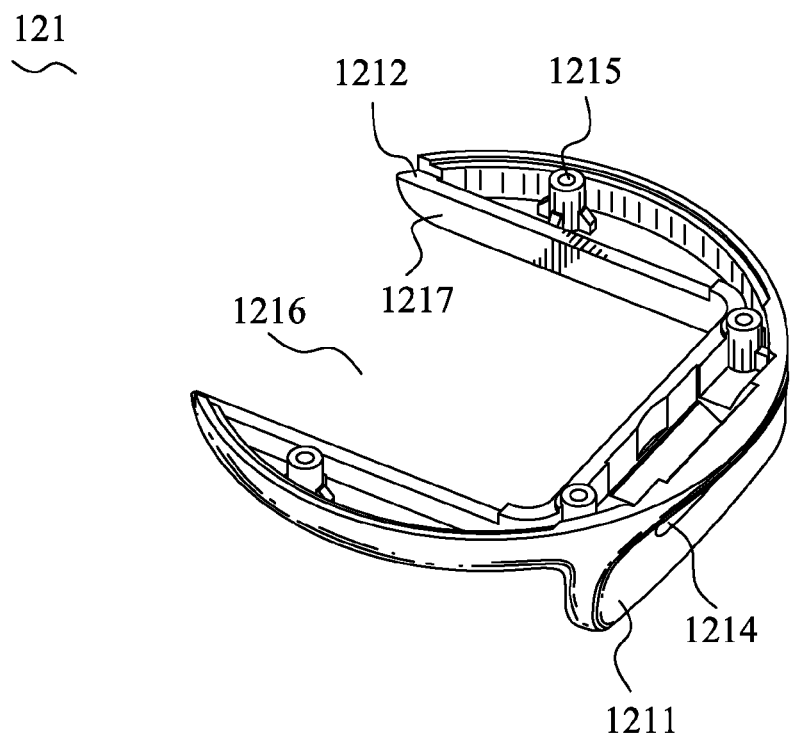
FIG. 3 is a perspective view of a holding body of a housing of the charging socket shown in FIG. 2 viewed from a bottom angle.

With reference to FIGS. 1-3, the holding element 12 has a holding body 121 and an elastic cushion 122 mounted to the holding body 121. The holding body 121 has a substantially circular body 1210, corresponding to the tray 110. The body 1210 has a rectangular open receiving recess 1216. The receiving recess 1216 passes through the body 1210 in an upward and downward direction to form two facing and separated side walls 1217 and an end wall 1218 connecting with the two side walls 1217. Each of the side walls 1217 is formed with a sliding groove 1212 at a bottom thereof. The sliding groove 1212 extends parallel to a sliding direction of the movable element 2 and communicates with the receiving recess 1216. A top surface of the end wall 1218 is protruded upwards to form a rectangular first holding plate 1211. The first holding plate 1211 has a trough 1213 at a surface thereof adjacent to the receiving recess 1216 for receiving the elastic cushion 122, and a restrictive recess 1214 at an opposite surface thereof and penetrating a bottom of the end wall 1218. A bottom of the body 1210 further has a plurality of mating thread holes 1215, corresponding to the thread holes 112 of the base 11.

Please refer to FIG. 2, the gasket 13 has a substantial circular gasket body 130. The gasket body 130 has a plurality of through holes 131 corresponding to the thread holes 112, and two abreast inserting grooves 132. The inserting grooves 132 extend along the sliding direction of the movable element 2 and are spaced away from each other with a predetermined distance. One of the inserting grooves 132 has two opposite ends defined as a first stopping end 1321 and a second stopping end 1322. Two guiding rails 132 are protruded upwards from two outmost sides of the inserting grooves 132, respectively.

Figure 4:
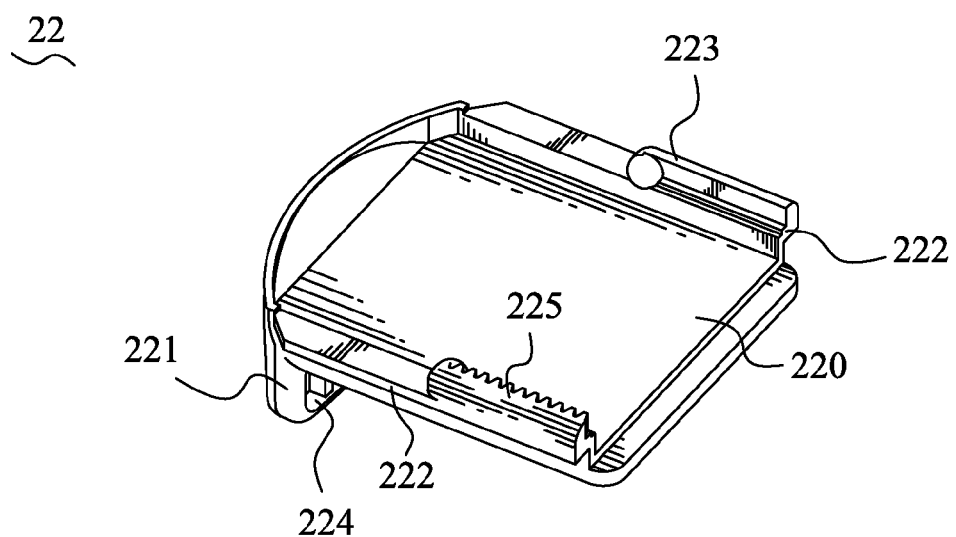
FIG. 4 is a perspective view of a movable body of a movable element of the charging socket shown in FIG. 2 viewed from the bottom angle.
Figure 5:
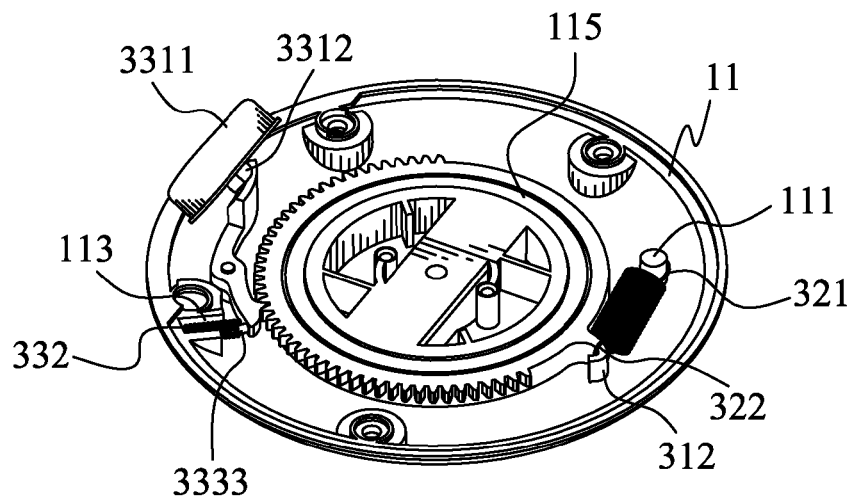
FIG. 5 is an assembled, perspective view of the charging socket shown in FIG. 1, wherein the movable element and a holding element are removed.
Figure 6:
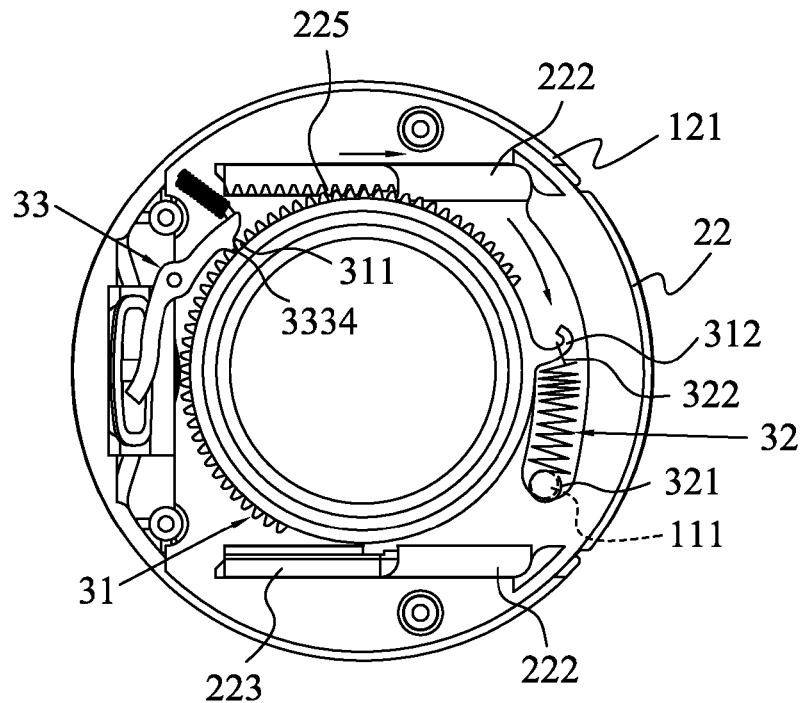
FIGS. 6-7 are schematic views showing the movement state of the movable element of the charging socket shown in FIG. 1 seen from the bottom angle, wherein the housing is removed.
Figure 7:
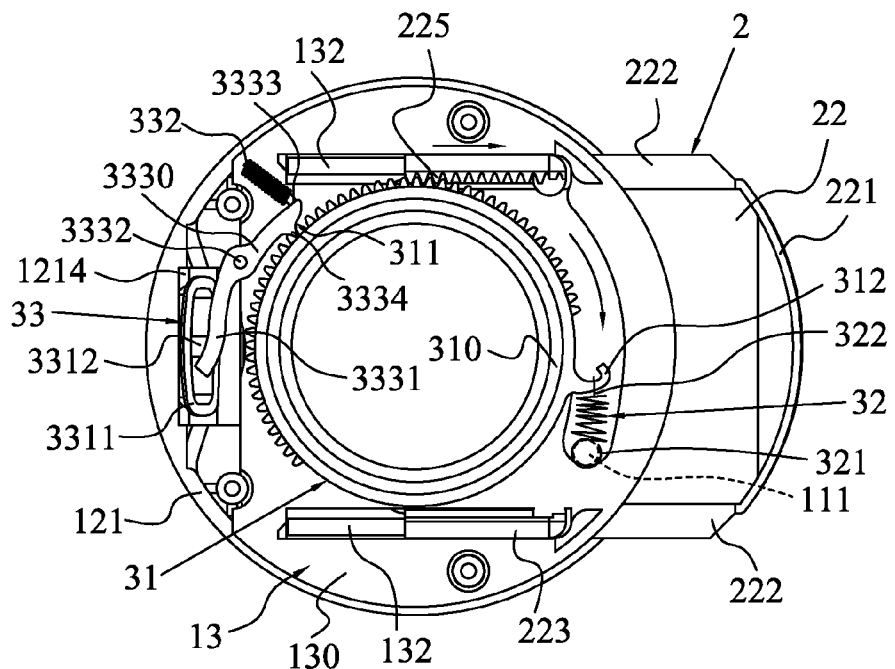
Figure 8:
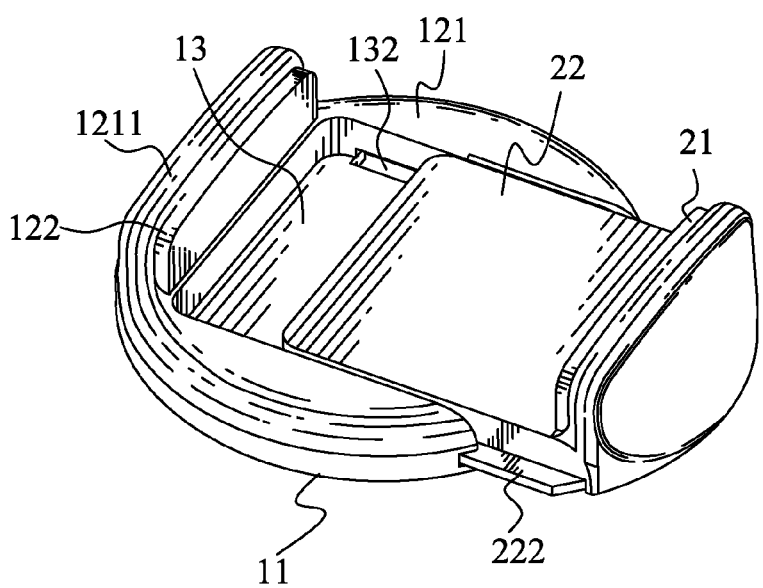
FIG. 8 is an assembled, perspective view of the charging socket shown in FIG. 1, wherein the movable element are moved outwards with respect to the housing.
Figure 9:
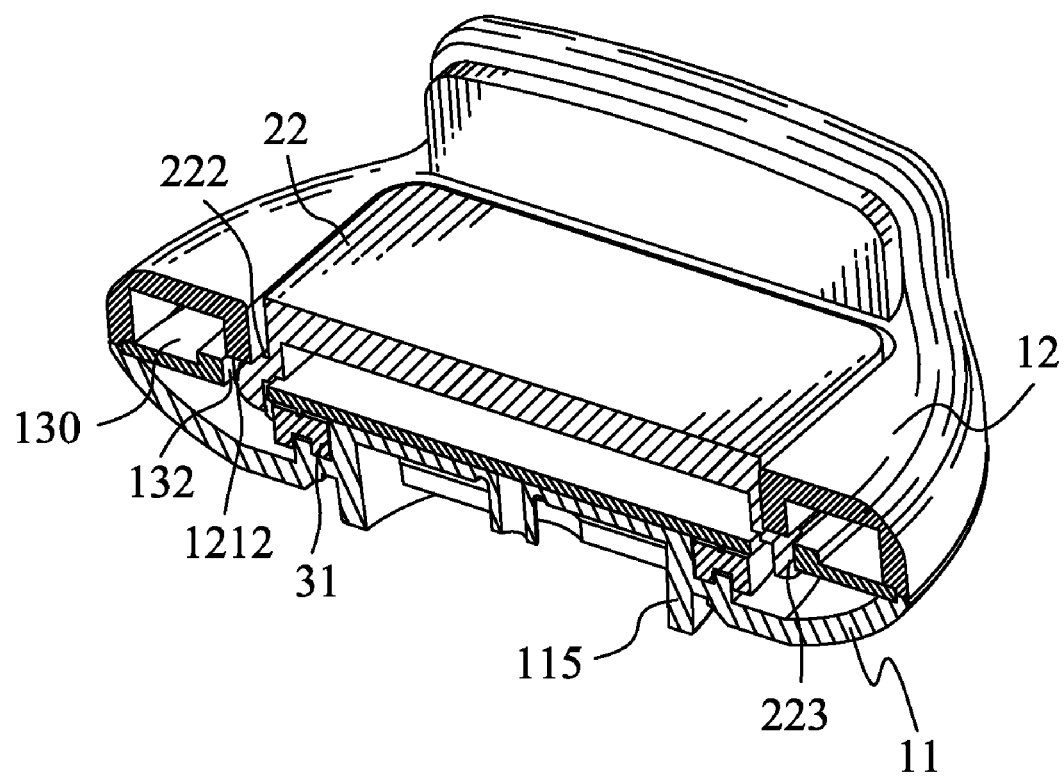
FIG. 9 is a cross-sectional view of the charging socket shown in FIG. 1 taken along line IX-IX.

With reference to FIGS. 1-2 and FIG. 4, the movable element 2 has a movable body 22 and an elastic cushion 21 mounted to the movable body 22. The movable body 22 has a rectangular basic plate 220, and a second holding plate 221 extended perpendicularly and upwards from an end of the basic plate 220. The second holding plate 221 has a trough 224 at a surface thereof facing the basic plate 220, for receiving the elastic cushion 21. Lower portions of two opposite sides of the basic plate 220 are protruded laterally to form wing portions 222 of strip shape. Bottom surfaces of the wing portions 222 are protruded downwards to form a protruding rib 223 and a rack 225 at ends thereof away from the second holding plate 221, with teeth thereof facing the protruding rib 223. The protruding rib 223 and the rack 225 are located in the inserting grooves 132 of the gasket 13 in assembly and shorter than the inserting grooves 132. The rack 225 is blocked by the first and second stopping ends 1321, 1322 in the movement of the movable element 2 with respect to the housing 1, functioned as stop means.

Please refer to FIG. 2, the positioning component includes a gear element 31, a connecting spring 32 and a control element 33. The gear element 31 has a ring-like body 310. The ring-like body 310 has a plurality of gear teeth 311 formed at a portion of an outer periphery thereof, and a hook 312 located adjacent to an end of an annular row formed by the gear teeth 311. The connecting spring 32 has a first ring 321 at an end thereof and a second ring 322 at an opposite end thereof.

The control element 33 has a button 331, a spring 332 and a transitional member 333. The button 331 has an open case 3311, and a pressing lump 3312 protruded outwards from a bottom surface of the case 3311. The transitional member 333 has a swingable arm 3330. The swingable arm 3330 has a pivot column 3332 at a substantially middle portion thereof. Two sides of one free end of the swingable arm 3330 are protruded oppositely to form an inserting portion 3333 and a ratchet tooth 3334, for inserting an end of the spring 332 and buckling with gear teeth 311, respectively. The other free end of the swingable arm 3330 is defined as a pressing end 3331, corresponding to the pressing lump 3312. In this embodiment, the swingable arm is bent to have a predetermined arc, conforming to the ring-like body of the gear element. The pressing end is bent along a direction opposite to an extending direction of the swingable arm to show an arc shape, for improving the connection stability between the pressing end and the pressing lump.

Referring to FIGS. 1-3, FIGS. 5-6 and FIG. 9, in assembly, the gear element 31, the connecting spring 32 and the control element 33 are mounted into the base 11. The ring-like body 310 is engaged with the shaft 115. The first ring 321 of the connecting spring 32 is fixed to the positioning column 111, and the second ring 322 is hitched to the hook 312. The pivot column 3332 of the transitional member 333 is pivoted to the pivot hole 114. The ratchet tooth 3334 is engaged with the gear teeth 311. The spring 332 is restrained in the fixing groove 113 and has the end resting against the inserting portion 3333 elastically. The button 331 is received in the restrictive recess 1214 of the holding element 12 when the holding element 12 is mounted to the base 11. The pressing lump 3312 of the button 331 rests against the pressing end 3331 of the transitional member 333. The gasket 13 covers the base 11. The holding element 12 is coupled with the base 11, with the gasket 13 located therebetween. The guiding rails 133 are respectively received in the sliding grooves 1212. A plurality of screws 14 is provided and passes through the thread holes 112 and the corresponding through holes 131 to engage with the corresponding thread holes 1215, for fixing the holding element 12 and the base 11 together.

Referring to FIGS. 2-4, FIGS. 6-9, the movable element 2 is received in the receiving recess 1216 of the holding element 12. The wing portions 222 are inserted into the corresponding sliding grooves 1212 and rest against the respective guiding rails 133. The protruding rib 223 and the rack 225 are restrained in the inserting grooves 132. The rack 225 engages with the gear element 31. Herein, it should be noted that the assembling process of the charging socket can be changed for meeting different demands and should not be limited. When the button 331 is pressed by an outer force, the pressing lump 3312 pushes the pressing end 3331 toward the gear element 31 so that the swingable arm 3330 swings, taken the pivot column 3332 as the center. The ratchet tooth 3334 is urged to move away from the gear element 31 and disengages with the gear teeth 311, at the meanwhile, the inserting portion 3333 compresses the spring 332. The gear element 31 is forced to rotate anticlockwise because of the resilient force from the connecting spring 32. As the rack 225 of the movable element 2 is buckled with the gear element 31, the movable element 2 is brought to move outwards with respect to the housing 1. Consequently, the second holding plate 221 is spaced away from the first holding plate 1211 with an increasing distance, until the rack 225 is blocked by the first stopping end 1321 of the gasket 13. At this time, the button 331 is released, and the ratchet tooth 3334 is pushed to engage with the gear teeth 311 of the gear element 31 by the stored elastic force of the spring 332 and stop the gear element 31 from turning anticlockwise, thereby fixing the position of the movable element 2 with respect to the housing 1.

Referring to FIG. 1, FIGS. 6-8, When the movable element 2 is required to return the original position, the second holding plate 221 is pushed by a pushing force toward the first holding plate 1211. As the rack 225 of the movable element 2 is buckled with the gear element 31, the gear element 31 is forced to rotate clockwise until the rack 225 is blocked by the second stopping end 1322 of the gasket 13, lengthening the connecting spring 32. In this process, the ratchet tooth 3334, which allows the gear element 31 to rotate in one direction, slides on and interposes the gear teeth 311 for stopping the gear element 31 from anticlockwise rotation when the pushing force disappears. Therefore, the movable element 2 is positively kept in position between the first stopping end 1321 and the second stopping end 1322.

As described above, the charging socket 100 is provided with the movable element 2 which is capable of being moved respect to the housing 1 by the positioning component. Accordingly, the dimension between the first and second holding plates 1211, 221 can be adjusted according to the outline dimension of different types of the electronic devices, thereby holding the electronic devices firmly, which spreads the application range of the charging socket 100. Meanwhile, the charging socket 100 is convenient for user to repeat use and improves the holding performance.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A charging socket for holding an electronic device, comprising:
    a housing having a base and a holding body covering the base, the holding body having an open receiving recess, and a first holding plate extended upwards from a wall of the receiving recess opposite to an opening of the receiving recess;
    a gear element having a ring-like body mounted in the base, the ring-like body having a plurality of gear teeth at an outer periphery thereof, and a connecting portion connected with the base by a connecting spring for forcing the ring-like body to rotate;
    a swingable arm pivoted to the base and having a ratchet tooth at a free end thereof engaged with the gear teeth for stopping the ring-like body from being pulled by the connecting spring to rotate;
    a movable element having a basic plate slidably received in the receiving recess, and a second holding plate extending upwards from an end of the basic plate away from the first holding plate, facing and spaced from the first holding plate for holding the electronic device therebetween, a side of the basic plate connected with a rack which extends along a sliding direction of the movable element and is lower than a bottom of the basic plate, for engaging with the gear teeth of the gear element,
    wherein the ratchet tooth of the swingable arm is swung to disengage with the gear teeth, the ring-like body is pulled by the connecting spring to rotate, the second holding plate is urged to move away from the first holding plate because of the engagement between the rack and the gear teeth,
    wherein when the second holding plate is pushed to approach the first holding plate, the gear element is brought by the rack to rotate, the ratchet tooth slides along the gear teeth and stops the gear element from being pulled by the connecting spring to rotate reversely.

2. The charging socket as claimed in claim 1, wherein the connecting portion of the ring-like body is a hook protruded from a portion the outer periphery apart from the gear teeth, the connecting spring has a first ring fixed to a positioning column of the base, and a second ring hitched to the hook.

3. The charging socket as claimed in claim 2, wherein the base has a circular tray, the positioning column and a pivot hole for receiving a pivot column of the swingable arm, are located on the tray and arranged substantially symmetrically about a center of the tray.

4. The charging socket as claimed in claim 1, wherein the swingable arm is pivoted to the base around a center thereof and adjacent to the gear element, a free end of the swingable arm opposite to the ratchet tooth is connected with a button exposing outside of the housing.

5. The charging socket as claimed in claim 1, wherein two opposite sides of the free end of the swingable arm are projected oppositely to form the ratchet tooth and an inserting portion, a spring is restrained in a fixing groove of the base and resiliently rests against the inserting portion for forcing the ratchet tooth to engage with the gear teeth.

6. The charging socket as claimed in claim 1, wherein the holding body defines two facing side walls and an end wall connecting with the two side walls, surrounding the receiving recess, the first holding plate is protruded upwards from the end wall.

7. The charging socket as claimed in claim 6, wherein each of the side walls is formed with a sliding groove at a bottom thereof, the sliding grooves extend parallel to the sliding direction of the movable element and communicate with the receiving recess for receiving two wing portions protruded laterally from two opposite sides of the basic plate.

8. The charging socket as claimed in claim 7, wherein bottom surfaces of the wing portions are protruded downwards to form a protruding rib and the rack at ends thereof away from the second holding plate, teeth of the rack face the protruding rib.

9. The charging socket as claimed in claim 8, further comprising a gasket disposed between the base and the holding body, the gasket having two inserting grooves extending parallel to the sliding direction of the movable element for allowing the protruding rib and the rack to slide therein.

10. The charging socket as claimed in claim 1, further comprising two elastic cushions, the first and second holding plates having two facing surfaces formed with troughs for receiving the elastic cushions.

\* \* \* \* \*